United States Patent [19]

Noguchi

[11] Patent Number: 5,508,850
[45] Date of Patent: Apr. 16, 1996

[54] OBJECTIVE REVOLVER OF OPTICAL APPARATUS

[75] Inventor: Motoki Noguchi, Yokohama, Japan

[73] Assignee: Nikon Corporation, Tokyo, Japan

[21] Appl. No.: 127,072

[22] Filed: Sep. 27, 1993

[30] Foreign Application Priority Data

Sep. 30, 1992 [JP] Japan ..................................... 4-260420

[51] Int. Cl.⁶ .............................. G02B 7/02; G02B 21/00
[52] U.S. Cl. ........................... 359/821; 359/368; 359/384
[58] Field of Search ..................................... 359/368, 381, 359/382, 384, 819, 821; 318/640

[56] References Cited

U.S. PATENT DOCUMENTS

| | | | |
|---|---|---|---|
| 2,871,776 | 2/1959 | Calamai | 359/821 |
| 4,307,940 | 12/1981 | Hagedorn-Olsen | 359/821 |
| 4,961,636 | 10/1990 | Gaul et al. | 359/821 |
| 5,128,808 | 7/1992 | Dosaka | 359/821 |

*Primary Examiner*—Thong Q. Nguyen
*Attorney, Agent, or Firm*—Shapiro and Shapiro

[57] ABSTRACT

In an electrically-powered revolver, a cylindrical fixed shaft is provided substantially in the center of a fixed member, a motor is fixedly set inside the fixed shaft, the motor is connected via gears with a cover having an internal gear, and the cover is rotated together with a rotating member.

12 Claims, 7 Drawing Sheets

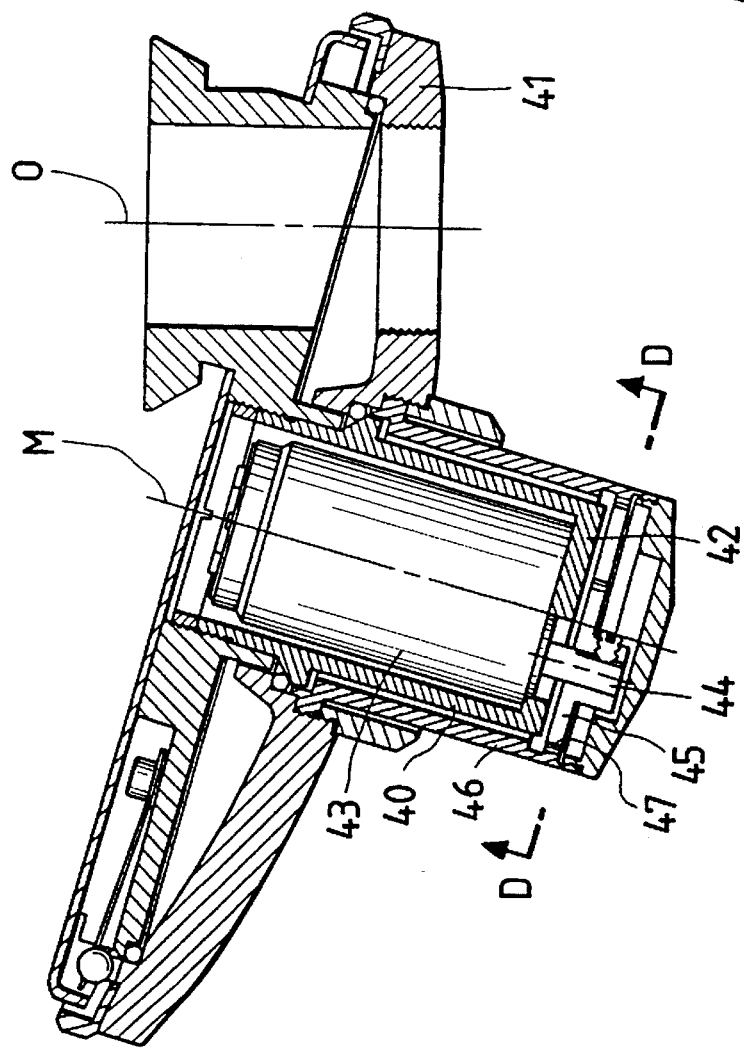
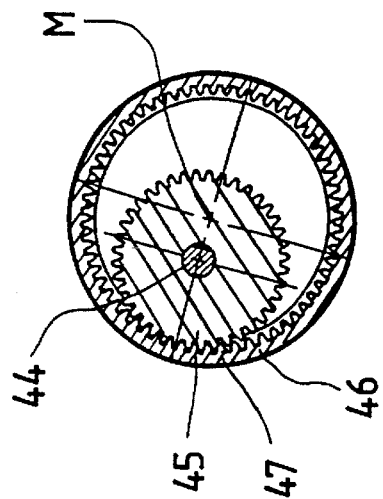
FIG. 4A
FIG. 4B

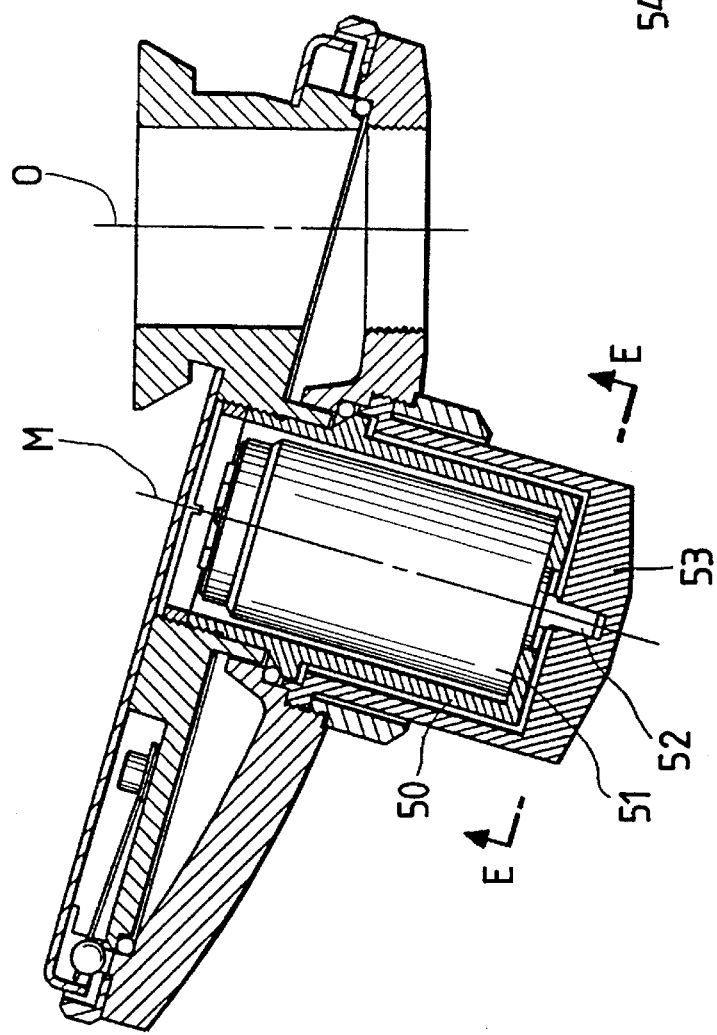
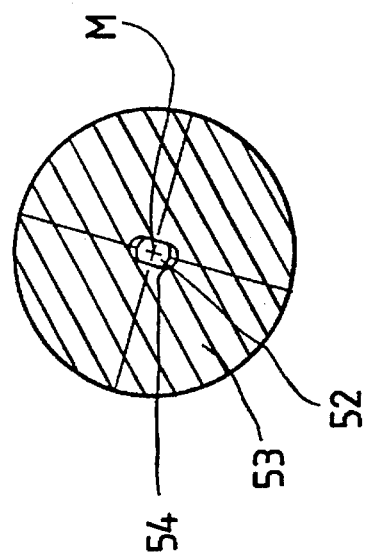
FIG. 5A
FIG. 5B

OBJECTIVE REVOLVER OF OPTICAL APPARATUS

BACKGROUND OF THE INVENTION

1. Field of the Invention

The present invention relates to an objective revolver to be used in an optical apparatus such as a microscope, and is more particularly concerned with a scheme for arranging a motor for driving the revolver.

2. Related Background Art

There has been known a microscope provided with an objective revolver which is electrically driven to automatically exchange objective lenses.

Generally, as shown in FIG. 7, such an objective revolver 100 has a plurality of different objective lenses 101 and is attached to an arm 200.

The objective revolver 100 comprises, as shown in FIG. 8, a fixed member 110 to be fixed to a microscope, a rotating member 120 which is rotatably set to the fixed member 110 and a motor 130 for rotating said rotating member 120.

The fixed member 110 is fixed to the arm 200 (see FIG. 7) of the microscope by means of a round dovetail member 111, and a through hole serving as a part of the optical path of the microscope is formed through said round dovetail member 111.

The fixed member 110 revolvably supports the rotating member 120 with a group of steel balls 121, another group of steel balls 122 and a fixed shaft member 123. The rotating member 120 has a plurality of fitting holes 124 each fitting an objective lens 101, and a gear ring 126 around which a ringed external gear 125 is formed.

The motor 130 is fixed to the fixed member 110 by an L-shaped metal stopper 131. A bevel gear 133 is fixedly set around a rotation shaft member 132 of the motor 130. The bevel gear 133 is engaged with another bevel gear 134, which is fixed to an end of a rotation shaft member 135. Around the other end of the rotation shaft member 135, a gear 136 is formed, which is engaged with the external gear 125 of the gear ring 126.

The objective revolver 100 also has a cover 112 for preventing the rubbish caused by the engagement of the gears from falling down. The cover 112 is fixed to the fixed member 110 so as to cover the external gear 125 and the gear 136 and the engagement of the external gear 125 with the gear 136.

The objective revolver 100 rotates the motor 130 according to the directions from a switch (not shown) in order to transmit torque via the plurality of gears 133, 134, 136 and 125 to the rotating member 120, thereby exchanging the objective lenses to be positioned on the optical path including the optical axis 0.

In this conventional objective revolver, however, the motor 130 and the group of gears 133, 134, 136 and 125 for transmitting torque of the motor 130 are arranged outwards from the rotating member 120. Accordingly the arm 200 should have an inner space to contain the motor and the gears, which makes the strength of the arm 200 insufficient. Therefore, when a heavy lens barrel and/or other attachments (such as a photographing device) are mounted on the arm 200, the arm 200 becomes rickety and deflects and the optical axis deviates so that the image is blurred.

SUMMARY OF THE INVENTION

The objective revolver according to the present invention is miniaturized by adopting a different arrangement of the motor.

In the objective revolver according to the present invention, a cylindrical fixed shaft member is fixedly attached to a fixed member, and the motor is fixedly set inside the fixed shaft member.

Therefore, the objective revolver according to the present invention does not have to have a space outwards from the fixed member or a rotating member, which is necessary to arrange the motor for the above-mentioned conventional objective revolver.

Further, the objective revolver according to the present invention utilizes a cover for covering the motor as a transmission member for transmitting driving force from the motor, and contains gears for speed reduction inside.

Accordingly, the objective revolver according to the present invention does not have to have another cover only for preventing the rubbish from falling down. In this case, since a space for such a cover is not required around the periphery of the revolver, the entire body of the objective revolver can be miniaturized.

In the following detailed description of the preferred embodiments, the objective revolver according to the present invention is applied to erect microscopes, but it can also be applied to inverted microscopes in order to miniaturize them.

BRIEF DESCRIPTION OF THE DRAWINGS

FIG. 4A is a lateral sectional view of the first modification;

FIG. 4B is a sectional view of the first modification seen from the direction indicated by arrows D—D in FIG. 4A;

FIG. 5A is a lateral sectional view showing the second modification;

FIG. 5B is a sectional view of the second modification seen from the direction indicated by arrows E—E in FIG. 5A;

DESCRIPTION OF THE PREFERRED EMBODIMENTS

Figure 1:
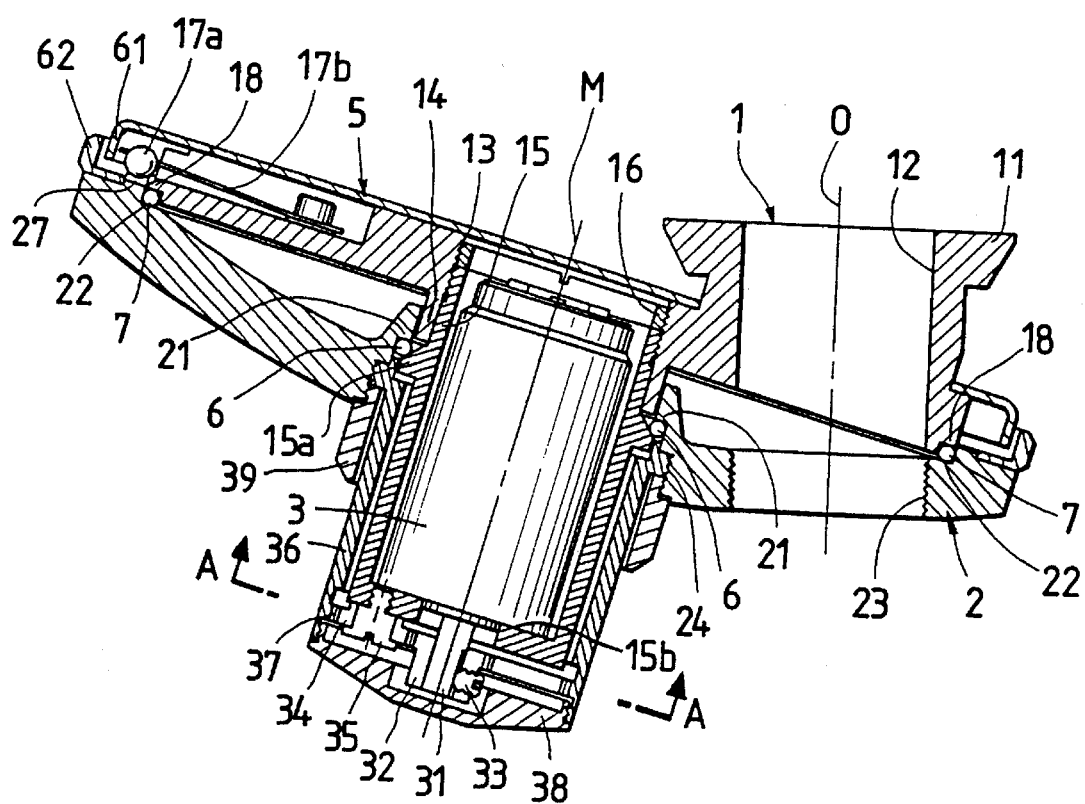
FIG. 1 is a cross-sectional view of an embodiment of the objective revolver.
Figure 2:
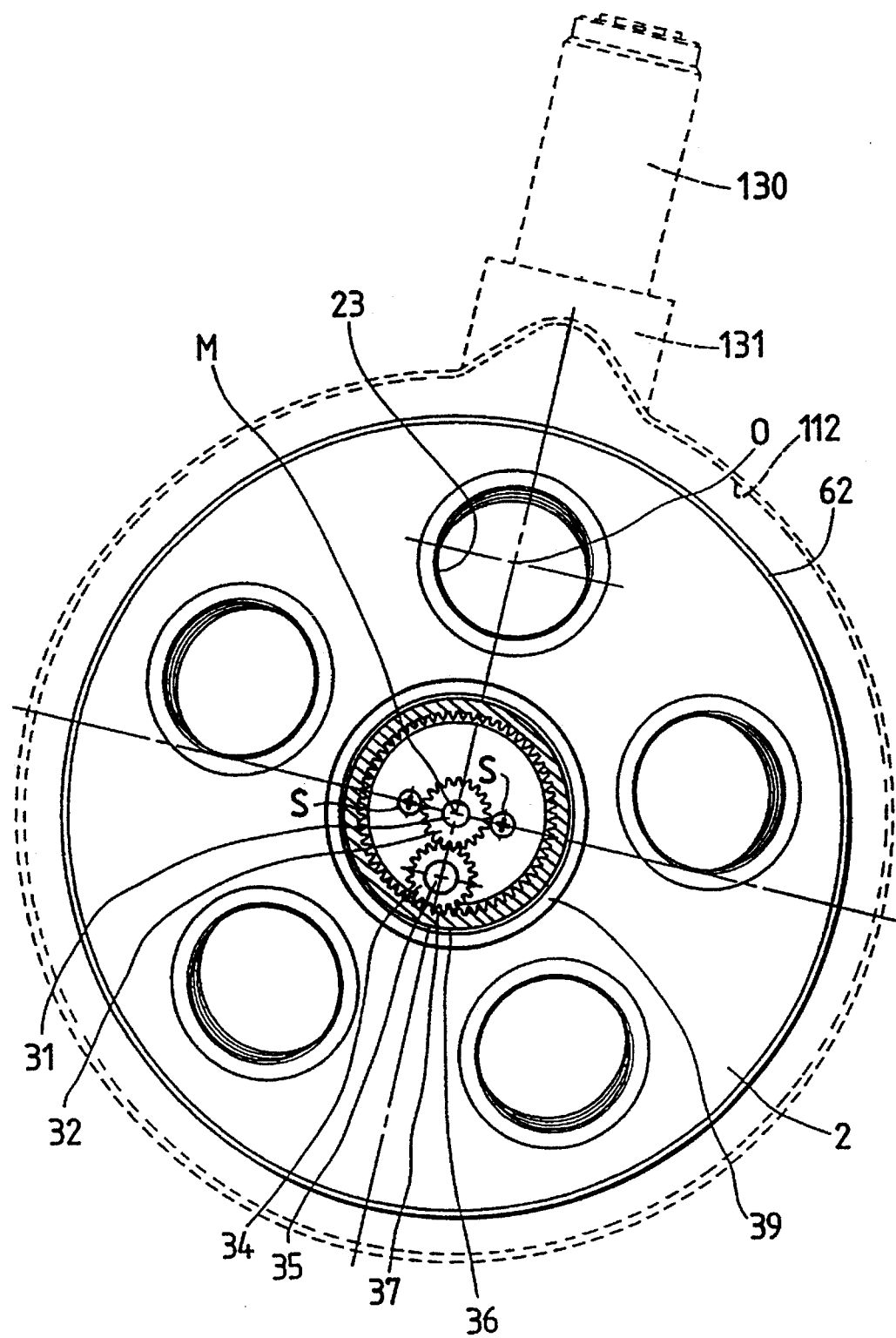
FIG. 2 is a view of the objective revolver seen from the direction indicated by arrows A—A in FIG. 1.
Figure 3:
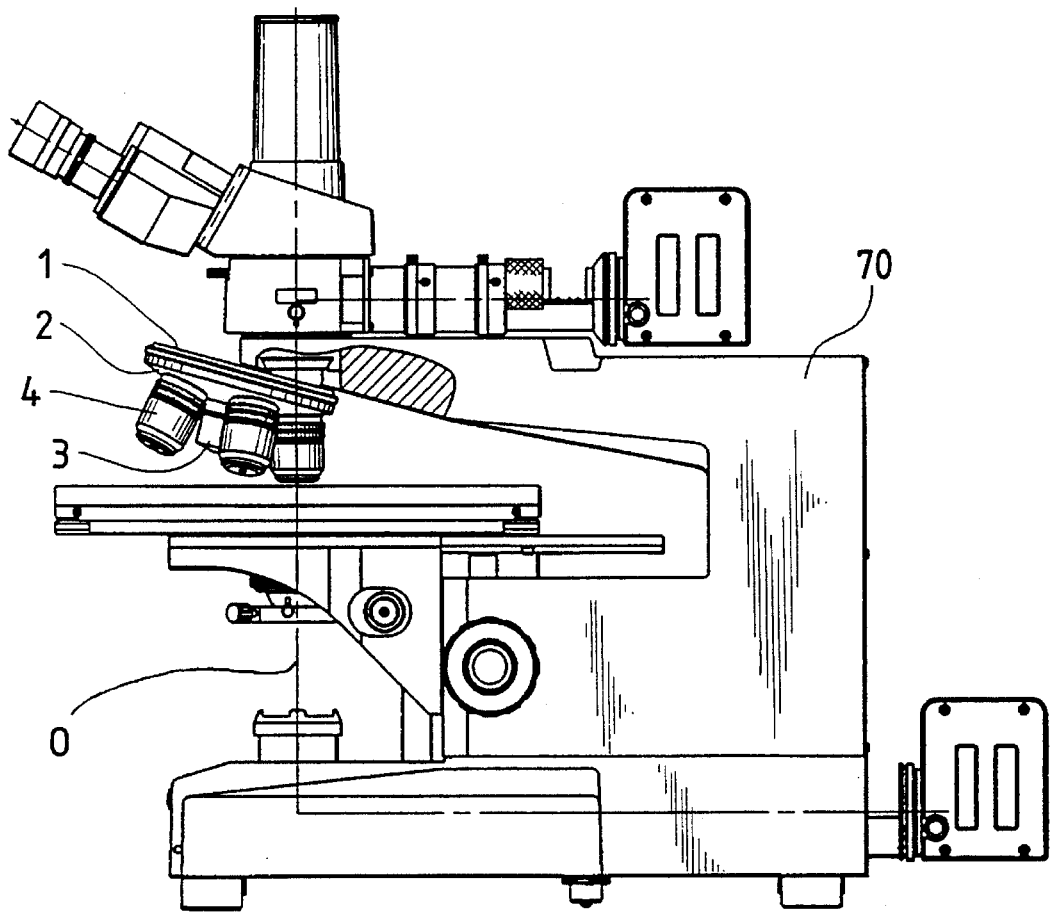
FIG. 3 is a view showing a microscope on which the embodiment of the objective revolver is mounted.

FIGS. 1 to 3 show an embodiment of the present invention.

The objective revolver shown in FIG. 1 consists of three major components: a fixed member 1, a rotating member 2 and a motor 3. As shown in FIG. 3, this objective revolver carries a plurality of objective lenses 4 and is fixed to the main body 70 of a microscope.

As shown in FIG. 1, the fixed member 1 has a round dovetail portion 11, which is fixedly attached to the main body 70 of the microscope. A hole 12 is formed through the center of the round dovetail portion 11 so that the center of the hole coincides with the optical path 0 of a light beam. The fixed member 1 also has a female threaded hole 13 whose center coincides with the rotation axis M. The female threaded inner surface of the hole 13 is further elongated downwards to form a protruding, cylindrical portion 14. A cylindrical fixed shaft member 15 is set inside the cylindrical portion 14 and is engaged with the female thread of the hole 13. A ringed protruding portion 15a is formed around the fixed shaft member 15 near the lower edge of the cylindrical portion 14. The lower edge of the fixed shaft member 15 is folded to form a base plate 15b which has a through hole at its center. A nut 16 formed around the upper part of the fixed shaft member 15 is engaged with the female thread of the hole 13 of the fixed member in order not to loosen from the hole 13. The fixed member 1 also has a click mechanism which is provided at the opposite side from the round dovetail portion 11 with respect to said rotation axis M. The click mechanism consists of a steel ball 17a and a blade spring 17b for supporting the steel ball 17a, and the blade spring is fixed to the fixed member with a screw. The steel ball 17a gets caught in click grooves 27 (described later) in order to position the rotating member 2. The fixed member 1 is covered with a cover 5 which also covers the click mechanism.

The rotating member 2 is revolvably set to the fixed member 1 via two circularly arranged groups of steel balls 6 and 7. More specifically, plurality of steel balls 6 are rollably set between the protruding portion 15a of the fixed shaft member 15 and an engagement portion 21 of the rotating member 2, while the steel balls 7 are rollably set between an engagement portion 18 formed around the lower edge of the periphery of the fixed member 1 and an engagement portion 22 formed on the top surface near the periphery of the rotating member 2. Thus, the rotating member 2 is revoluably supported by the fixed member 1.

The rotating member 2 has five fitting holes 23 for fitting objective lenses 4. The holes are formed at regular intervals along a circumference around the rotation axis of the rotating member 2, wherein the circumference intersects with the optical axis 0. The rotating member 2 also has a female threaded hole 24 whose center coincides with the rotation axis.

The motor 3 is set inside the fixed shaft member 15 and is fixed to the base plate 15b of the fixed shaft member 15 with two screws S, as shown in FIG. 2. A rotation shaft member 31 of the motor 3 protrudes downwards, as shown in FIG. 1. A gear 32 is fixed to the rotation shaft member 31 with a set screw 33. Another gear 34 engaged with the gear 32 is revolvably set to the fixed shaft member 15 with a screw 35. The gear 34 is engaged with an internal gear 37 formed in a cylindrical cover 36. As for the sizes and the numbers of teeth of these gears, as shown in FIG. 2, the gears 31 and 32 are substantially of the same size and have substantially the same number of teeth. The internal gear 37 has more teeth than the gears 31 and 32. Accordingly, the rotating speed of the motor 3 is reduced in order to obtain sufficient torque to rotate the rotating member 2. A bottom cover 38 for covering the motor 3 and the gears is engaged with the lower end of the cylindrical cover 36. And a male screw formed around the upper end of the cylindrical cover 36 is engaged with the female screw of the hole 24 of the rotating member 2. Also engaged with the hole 24 is a nut 39 for preventing the cylindrical cover 36 from coming off. On the upper surface in the peripheral part of the rotating member 2, as many V-shaped click grooves 27 as there fitting holes 23 are formed so that the grooves are on the opposite sides of the corresponding fitting holes with respect to the fixed shaft member 15.

In the objective revolver constructed as described above, when the motor 3 rotates the rotation shaft member 31, the torque is transmitted to the cover 36 and the rotating member 2 via the plurality of gears 32, 34 and 37.

Next, this embodiment of the objective revolver will be compared with the conventional objective revolver with reference to FIGS. 2 and 3. In FIG. 2, solid lines show the embodiment while dotted lines show the conventional revolver.

As shown in FIG. 2, the size of the present embodiment is smaller than that of the conventional revolver, because the rotation shaft member 31 of the motor 3 is located so that the axis of the shaft coincides with the rotation axis M of the rotating member 2. In other words, in this embodiment of the revolver, there are not any components (as 112, 130 and 131 indicated by dotted lines) which are arranged outwarp from the periphery of the fixed member or the rotating member.

Incidentally, as the embodiment of the revolver has the motor 3 and the covers 36 and 38, and so on around the center of the rotating member 2, these components protrude in a space other than the space required in the conventional revolver. However, as the objective lenses carried by the rotating member protrude around said space, said space has not been made good use of in the conventional revolver. Accordingly, even if the components (3, 36 and 38) protrude in said space among the objective lenses, they do not cause any new problems, but enable the objective revolver to be miniturized.

Further, though the conventional objective revolver has to arrange the motor inside the arm, the objective revolver of this embodiment has no members, except the dovetail portion of the fixed member, to be contained in the arm of the microscope, as shown in FIG. 3. Accordingly, a greater degree of freedom is given in arranging the objective revolver. At the same time, the main body itself of, for example, a microscope to which the objective revolver is attached can be miniturized.

In addition, the motor 3 and the gears are completely covered with the covers 36 and 38. Therefore, the rubbish caused by the engagement of the gears accumulates inside the covers and does not fall outside unless the cover 38 is removed from the rotating member 2.

Incidentally, for a given diameter of the rotating member, the present embodiment can accommodate more fitting holes for the objective lenses than the conventional revolver. This results from the fact that a cover need not be provided around the periphery of the rotating member, so that the diameter of the circumference on which the plurality of objective lenses are positioned can be larger.

Next, some modifications of the present invention will be described with reference to FIGS. 4A to 6, wherein differences between the modifications and the above-mentioned embodiment will be mainly described.

FIGS. 4A and 4B show a first modification of the objective revolver of the present invention. In this first modification, as shown in FIG. 4A, a cylindrical fixed shaft member 40 and the rotation axis M of a rotating member 41 are substantially coaxial, and the shape of a base plate of the fixed shaft member is different from that of the above-mentioned embodiment. Inside the fixed shaft member, a motor 43 is fixedly set with its rotation shaft member 44 eccentric from the rotation axis M. The motor 43 is provided with a speed reduction mechanism contained inside, which makes the rotation shaft member 44 eccentric. As shown in FIG. 4B, a relatively large gear 45 is fixedly set around the rotation shaft member 44 of the motor. The gear 45 is engaged with an internal gear 47 of a cover 46.

As described above, in the objective revolver according to the present invention, the axis of the rotation shaft member 44 of the motor 43 does not have to coincide with the rotation axis M, and the motor is fixedly set inside the fixed shaft member. Also, the sizes of the gears and the numbers of teeth of the gears as well as the number of the gears can be properly determined according to the kinds of the motors employed, as long as all the gears are covered by the cover. Incidentally, the speed reduction mechanism may be replaced by another mechanism such as a mechanism consisting of at least two pulleys having different sizes and a belt (belts) for connecting these pulleys.

FIGS. 5A and 5B show a second modification of the objective revolver of the present invention. As shown in FIG. 5A, in this second modification, a motor 51 is fixedly set in a cylindrical fixed shaft member 50, and a rotation shaft member 52 of the motor 51 is fixed directly to a cover 53. Further, the rotation shaft member 52 has flat portions opposed to each other and set in a slit 54 formed in the cover 53, as shown in FIG. 5B. Thus, the rotation shaft member 52 is connected with the cover 53 without a set screw, or the like.

In the objective revolver according to the present invention, the rotation shaft member of the motor may be fixed directly to the cover with the motor set inside the fixed shaft member. As for this second modification, however, note that the motor has to have either torque large enough to rotate the rotating member or a speed reduction mechanism provided inside the motor.

Figure 6:
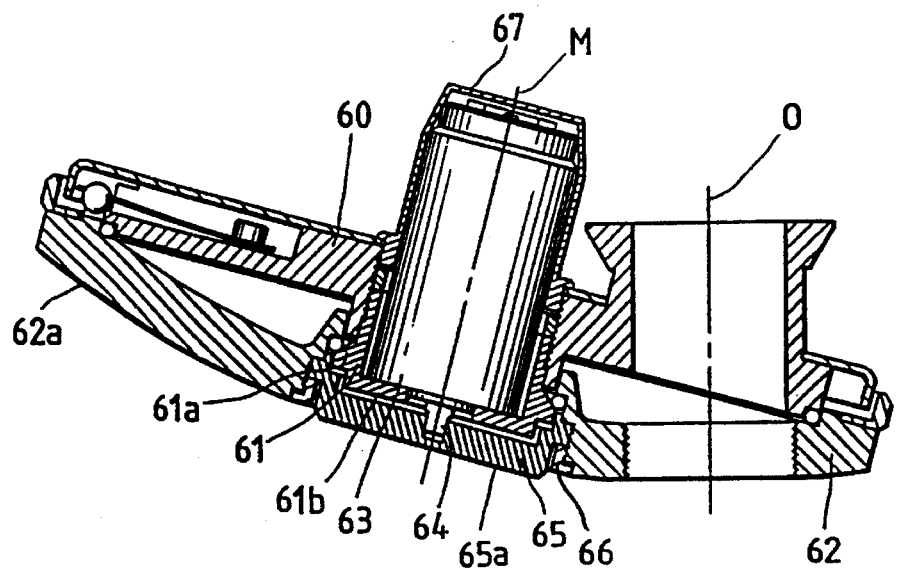
FIG. 6 is a lateral sectional view showing the third modification.
Figure 7:
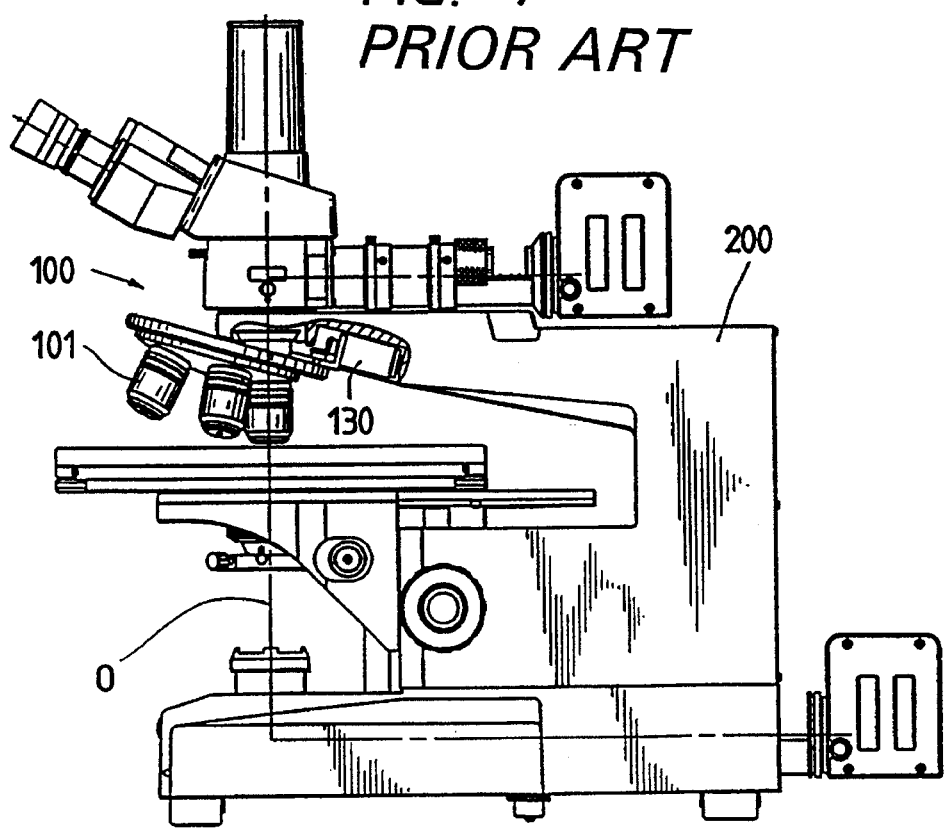
FIG. 7 is a lateral sectional view showing a conventional objective revolver.
Figure 8:
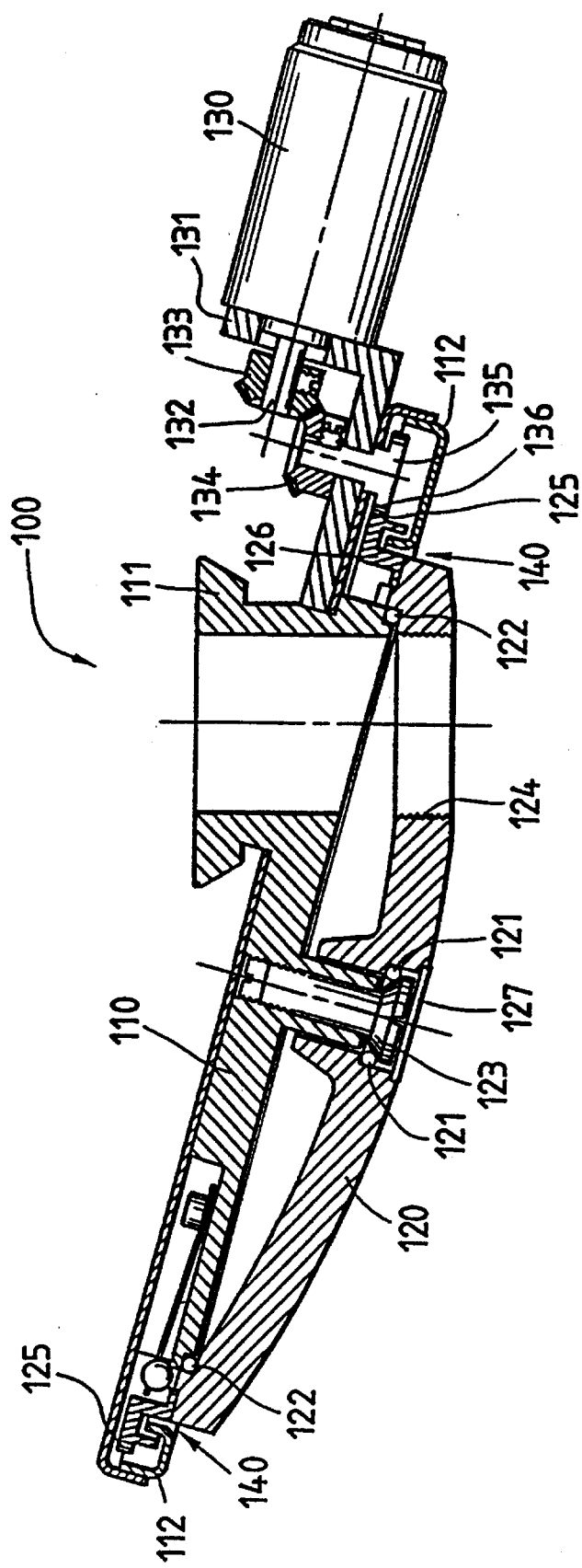
FIG. 8 is a lateral sectional view showing a part of a microscope on which the conventional objective revolver is mounted.

FIG. 6 shows a third modification of the objective revolver according to the present invention. In this objective revolver, a fixed shaft member 61 is engaged with a fixed member 60, and a conical protruding portion 61a is formed around the fixed shaft member 61, and further, a base plate 61b is formed right under said protruding portion 61a. A motor 63 is fixed to the base plate 61b so as to protrude upwards from the fixed member 60, and a rotation shaft member 64 of the motor 63 is, as in the second modification, fixed directly to a cover 65. The cover 65 is engaged with the female screw of the center hole of a rotating member 62 so that the surface 65a of the cover 65 substantially does not protrude downwards from the surface 62a of the rotating member 62. A nut 66 for preventing the cover 65 from coming off is engaged with the same female screw. The top of the motor 63 is covered with a cover 67, which is fixed to the fixed member 60.

As described above, according to the present invention, the motor may be arranged while protruding through and upwards from the fixed member, and the motor is fixedly set inside the fixed shaft member. In this construction, the facility of operation of a diopter ring can be improved in comparison with the above-mentioned embodiment and modifications, for example, when an objective lens with a correction ring for optically correcting an error caused by the thickness of the cover glass is used. Incidentally, if the facility of operation is exclusively considered, it is not necessary for the motor and the cover(s) to protrude only upwards from the fixed member, as shown in the third modification. Some parts of the motor and the cover(s) can protrude downwards from the rotating member.

What is claimed is:

1. An objective revolver comprising:

a fixed member fixed to a main body of an optical apparatus;

a rotating member which is revolvably set to said fixed member and can fit a plurality of objective lenses;

a cylindrical fixed shaft member which is fixed to said fixed member and revolvably supports said rotating member;

a motor arranged inside said fixed shaft member; and a cover covering said motor and non-rotatably fixed to said rotating member, said cover being drivingly connected by a torque transmission mechanism to said motor to transmit torque of said motor to said rotating member.

2. An objective revolver according to claim 1, wherein said cover is fixed to a shaft of said motor by said torque transmission mechanism.

3. An objective revolver according to claim 1, wherein said cover has an inner surface formed with a gear, and said torque transmission mechanism includes a gear which is engaged with said gear of said cover.

4. An objective revolver comprising:

a fixed member fixed to a main body of an optical apparatus;

a rotating member which is revolvably set to said fixed member and can fit a plurality of objective lenses;

a cylindrical fixed shaft member which is fixed to said fixed member and revolvably supports said rotating member;

a motor arranged inside said fixed shaft member; and a cover covering said motor and non-rotatably fixed to said rotating member, said cover being drivingly connected to said motor, through a plurality of transmission members which are arranged between said fixed shaft member and said cover, to transmit torque of said motor to said rotating member.

5. An objective revolver according to claim 4, wherein said rotating member has a substantially disk-like shape with an opening in its center;

said fixed shaft member is fixed to said fixed member so as to penetrate the opening of said rotating member and protrude from said fixed member; and said cover received at the opening of said rotating member.

6. An objective revolver according to claim 4, wherein said cover has an inner surface formed with a gear, and said transmission members include a gear which is engaged with said gear of said cover.

7. A microscope comprising:

a microscope main body;

a fixed member which is fixed to said main body;

a rotating member which is revolvably set to said fixed member and can fit a plurality of objective lenses;

a cylindrical fixed shaft member which is fixed to said fixed member and revolvably supports said rotating member;

a motor which is arranged inside said fixed shaft member; and a cover covering said motor and non-rotatably fixed to said rotating member, said cover being drivingly connected by a torque transmission mechanism to said motor to transmit torque of said motor to said rotating member.

8. A microscope according to claim 7, wherein said cover is fixed to a shaft of said motor by said torque transmission mechanism.

9. An objective revolver according to claim 7, wherein said cover has an inner surface formed with a gear, and said torque transmission mechanism includes a gear which is engaged with said gear of said cover.

10. A microscope comprising:

a microscope main body;

a fixed member which is fixed to said main body;

a rotating member which is revolvably set to said fixed member and can fit a plurality of objective lenses;

a cylindrical fixed shaft member which is fixed to said fixed member and revolvably supports said rotating member;

a motor which is arranged inside said fixed shaft member; and a cover covering said motor and non-rotatably fixed to said rotating member, said cover being drivingly connected to said motor, through a plurality of transmission members which are arranged between said fixed shaft member and said cover, to transmit torque of said motor to said rotating member.

11. A microscope according to claim 10, wherein said rotating member has a substantially disk-like shape with an opening in its center;

said fixed shaft member is fixed to said fixed member so as to penetrate the opening of said rotating member and protrude from said fixed member;

said fixed shaft member and said motor are arranged so as to protrude from said rotating member on a side of said objective lenses; and said cover is received at the opening of said rotating member.

12. A microscope according to claim 10, wherein said cover has an inner surface formed with a gear, and said transmission members include a gear which is engaged with said gear of said cover.

* * * * *